United States Patent [19]

Gray

[11] Patent Number: 4,823,456
[45] Date of Patent: Apr. 25, 1989

[54] METHOD FOR PROTECTING SUCKER ROD COUPLINGS FROM ABRASION AND CORROSION

[76] Inventor: Kenneth W. Gray, 2403 Bobwhite Dr., Odessa, Tex. 79762

[21] Appl. No.: 113,549

[22] Filed: Oct. 26, 1987

[51] Int. Cl.⁴ .............................................. B23P 25/00
[52] U.S. Cl. ..................................... 29/458; 29/527.2; 29/557; 166/106
[58] Field of Search ....................... 29/458, 527.2, 557; 166/106

[56] References Cited

U.S. PATENT DOCUMENTS 4,425,965  1/1984  R. Bayh, III et al. ............... 166/106
4,627,490  12/1986  Moore .............................. 166/106 X

*Primary Examiner*—Timothy V. Eley
*Attorney, Agent, or Firm*—Wendell Coffee

[57] ABSTRACT

A standard size, steel oil well sucker rod coupling is machined to decrease its external diameter, producing a constant diameter along its length. Then, the coupling is machined to produce chamfers or bevels around the circumference on the ends, such that the diameter at the radial faces is less than at the body of the coupling. Next, abrasive blast-cleaning of the coupling produces a uniform, angular, anchor profile along the machined areas on the exterior of the coupling. Finally, a specially selected, fusion bonded, resinous coating is applied to the external surface including each radial face. The unique protective coatings impart abrasion resistance in a pumping oil well and serve as an electrical barrier to preclude electrochemical, corrosive, attack of the mild steel coupling core. Extended service life of the coupling is achieved.

11 Claims, 2 Drawing Sheets

METHOD FOR PROTECTING SUCKER ROD COUPLINGS FROM ABRASION AND CORROSION

RIGHTS TO INVENTIONS UNDER FEDERAL RESEARCH

There was no federally sponsored research and development concerning this invention.

BACKGROUND OF THE INVENTION (1) Field of the Invention

This invention relates to pumping oil wells and more particularly to abrasion and corrosion of sucker rod couplings. Applicant submits that manufactures and users of oil well sucker rods and sucker rod couplings would be considered as having ordinary skill in this art.

(2) Description of the Related Art

Oil is removed from the ground using a pump-jack. This equipment is mounted on the surface of the earth above an oil reservoir. The pump-jack is connected to a down-hole pump using a sucker rod string. The sucker rod string includes several sucker rods, each sucker rod connected to the next by a coupling. Thus, oil is pumped from the reservoir to the surface for collection.

During the pumping action, the sucker rod string reciprocates in a tubing string. Due to deflection in the tubing string, the sucker rod string wears against the internal diameter of the tubing string. Even though lubricant in the form of crude oil is present in the annulus created between the sucker and tubing strings, abrasion occurs to the rods, couplings, and tubing.

Included in the crude oil are dissolved salts and undissolved minerals. When these come between the rods, couplings, and tubing, abrasion occurs. Through time, abrasion will decrease the rod and coupling diameters to a point that they will break under the stress upon the sucker rod string. In addition to the damage done to the sucker rod string, the abrasion will also wear away the tubing wall.

When a hole develops in the tubing wall, pressure inside the tubing string is lost, and the crude oil is pumped into the annulus created between the tubing and casing.

When a rod parts, a coupling breaks, or holes in the tubing occur, the sucker rods and/or tubing must be pulled from the well and inspected. Defective rods, couplings, and tubing must be replaced. The resultant pulling unit costs and down-time are a great expense for the pumping unit operator.

At the same time that abrasion is destroying the sucker rods, rod couplings, and tubing; all are being attacked by harsh, down-hole chemicals. Dissolved gasses and salts in the crude oil, in combination with the water, will destroy unprotected rods, couplings, and tubing, through corrosion. When sufficient corrosive attack has occurred, the sucker rods and couplings will break under the weight of the sucker rod string. The rods, rod couplings, and tubing must be replaced, due to corrosion.

Mild steel sucker rod couplings are the most commonly used couplings today. These couplings are beveled on both ends to preclude gouging of the tubing wall. The sucker rod pin ends are screwed into the coupling, using a specified torque, such that they shoulder up to the coupling face. The coupling is usually threaded throughout its entire length. The diameter of the coupling will vary, dependent upon the diameter of the sucker rod for which the coupling was manufactured. Precise machining of the radial face of the coupling is required to insure uniform contact with the face of the sucker rod pin end, around its circumference. Uneven pressures at this junction will lead to pin end failures in service.

Because these couplings are made of mild steel, they are subject to corrosive attack by down-hole chemicals. They are also subject to abrasion, when rubbing against the tubing as they reciprocate in the tubing string. Abrasion is magnified because the hardness of these couplings is the same as the mild steel tubing in which they are used. (Metals of similar hardness will abrade one another.)

To overcome the abrasion and corrosive attack of the mild steel sucker rod couplings, the oil industry capitalized on the relationship that "metals of dissimilar hardness will polish one another". Sucker rod couplings with a mild steel core and a stainless steel jacket were developed to take advantage of this relationship. They were first used in pumping wells which were highly deviated and therefore, caused excessive abrasion of the mild steel sucker rods, couplings, and tubing. Special grades of stainless steel were chosen, since stainless steel has greater resistance to corrosive attack, and since it has a greater hardness than mild steel. These rod couplings were prepared by machining away some of the original diameter of the mild steel couplings and depositing a jacket of stainless steel, using an arc plasma spray technique. The final diameter was the same as the original diameter. These stainless steel jacketed couplings had to be chamfered on the ends, since they would easily cut away the mild steel tubing as they reciprocated in the tubing string. The internal thread configuration was not altered.

This abrasion resistance technique proved to be beneficial in highly deviated pumping wells. A significant reduction in abrasion was noted. The stainless steel jacket was also impervious to attack by the down-hole chemical environment. In cases where the couplings were not chamfered on the ends, the tubing was quickly cut away, due to the greater hardness of the stainless steel jacket. In addition to this problem, the manufacturing process for these couplings was considerably more expensive than for mild steel couplings. These couplings were also difficult to install and remove. Rod tongs and wrenches could not grip the stainless steel jacketed couplings, because of their surface hardness. Both would slip as torque was applied to install or remove these couplings.

Another approach to solving the problems of abrasion and corrosion of sucker rod couplings is described in U.s. Pat. No. 4,602,807 to BOWERS. Using this technique, a sucker rod coupling is first machined to decrease its diameter. Then, one or more grooves are cut into the external diameter of the coupling. Special retaining ridges are also left on the ends of the couplings. Once machine, each coupling is given a jacket of polyurethane, using an injection molding technique. One set of expensive molds must be made for each coupling diameter. This polyurethane jacket is not bonded ot the sucker rod coupling. Without the special grooves and ridges, the polyurethane jacket would slip from its protective position around the coupling. The combination of expensive machining with the expensive molds for the injection molding process, make this an expensive sucker rod coupling. Since the polyurethane jacket is not bonded to the sucker rod coupling surface, corrosive chemicals will spread under the polyurethane jacket, attacking the metal substrate. This polyurethane jacket only extends to the radial face of the coupling. A metal-to-metal seal is formed when the coupling is installed on the sucker rod pin end. While this technique provides greater abrasion resistance than bare, mild steel sucker rod couplings, it will eventually fail, due to corrosive attack of the mild steel coupling core.

In yet another approach, a mild steel coupling is machined to decrease its diameter throughout the center section of the coupling. Ridges are left on both ends to hold the abrasion resistant, injection molded plastic protector in place. Once machined, the plastic is molded into the recessed area of the coupling to have a larger diameter than the original diameter and the retained ridges. The sections of greater diameter provide abrasion resistance where the sucker rod couplings make contact with the inside diameter of the tubing string. The mild steel ends are left unprotected. Corrosive chemicals will attack the mild steel ends on these couplings. Since this plastic is not bonded to the coupling, corrosive fluids can spread between the molded plastic jacket and the mild steel coupling body. When installed on a sucker rod, a metal-to-metal seal is formed between the face of the sucker rod pin end and the coupling shoulder. Besides being subjected to corrosion at this point, the corrosive down-hole fluids will spread inside the coupling, attacking it from the inside. These fluids will also attack the pin end of the sucker rod. Corrosion within the recessed area of the sucker rod pin ends is responsible for many sucker rod breaks in service. Less then precise machining of the sucker rod pin end face of the coupling shoulders will leave gaps between the rod and the coupling. Corrosive fluids can penetrate the coupling more easily when this condition exists. Imprecise machining can also lead to localized stresses on the sucker rod pin ends. These stresses will eventually cause the pin ends to break off the sucker rods, or the couplings to break into.

Couplings which have an injection molded, abrasion resistant jacket around them have met with limited success due to the problem already mentioned: Manufacturing expense, lack of a bond between the plastic jacket and the coupling body to preclude the spread of corrosive chemicals between them, and lack of an improved sealing surface of the shoulders of the couplings to prevent the migration of corrosive fluids into the hollow core of the couplings.

While stainless steel jacketed couplings have provided more abrasion resistance than mild steel couplings, and even though they are more resistant to down-hole chemicals, there are still shortcomings with this style of sucker rod couplings. Problem areas include: Manufacturing costs, ability to install and remove because of their surface hardness, and the lack of an improved sealing surface on the shoulders of the couplings to prevent the spread of corrosive chemicals into the hollow, mild steel core of the couplings.

The injection molded, plastic jacketed, and stainless steel jacketed couplings have another common deficiency: they can both unscrew down-hole becaause they are not locked in place on the sucker rod pin ends. Precise machining of the sucker rod pin end face and coupling shoulders is required in order to achieve a good seal around the coupling circumference. A metal-to-metal friction-fit seal is formed to hold the coupling and sucker rod together. Due to the weight of the sucker rod string in combination with the pounding of the rods and couplings against the tubing wall, the rods and couplings will often unscrew.

Fusion bond applied power plastic coatings have been used for many years, to prevent corrosion of sucker rods. These coatings are applied over abrasive blast-cleaned, mild steel sucker rods, as well as arc plasma sprayed stainless steel jacketed sucker rods. To have utility as a sucker rod coating, the coating resin must withstand the attack by corrosive down-hole chemicals. It must also bond to the sucker rod body and not blister or disbond in-service. The resin system must have a little flexibility, since the sucker rods will bend and flex in-service. Abrasion resistance is also required, to keep the coating from being worn away as the coated sucker rods reciprocate in the tubing string. Resistance to mechanical impact is a concern, since the coated sucker rods will slap against the tubing wall. Excessively high impact resistance, however, is not the primary requirement for a sucker rod coating. To fulfill these requirements, fusion bond coatings of the epoxy and modified-epoxy classes are used. These coating resin classes provide the required protection for sucker rod body. They are applied along the body of the rod, from one pin end face to the other. No coating is deposited on the sucker rod joint faces. Special masks are used to prevent coating deposition at this point, since it will adversely effect the ability of the sucker rod and coupling to form a friction-fit, metal-to-metal seal. Because these coatings resist compression and are hard and smooth, a coupling would unscrew from the sucker rod, if this type resin were present between the coupling shoulder and the rod face. Coatings of the epoxy and modified-epoxy classes are applied, mostly, in a fustion bond, powder form, (a) via electrostatic spray, or (b) hot flocking.

If coating resins with the physical and chemical properties of these sucker rod coatings were used to protect the sucker rod couplings, they would fail, due to their poor impact and chip resistance. For this reason, coated sucker rods are used in combination with stainless steel jacketed couplings, or injection molded, plastic jacketed couplings. Rod tongs and wrenches would crack, chip, and disbond coatings of the epoxy or modified-epoxy class, if they were present on the sucker rod couplings. Since the sucker rod couplings have a greater diameter than the sucker rods, most of the forces of down-hole impact are concentrated on the couplings. This concentrated down-hole pounding would destroy coatings of the epoxy or modified-epoxy class, if used to protect the exterior of the sucker rod couplings.

Before this application was filed, in addition to the background information the inventor was aware of, the inventor also caused searches to be made in the United States Patent and Trademark Office. This search developed the following references:

| Inventor | U.S. Pat. No. |
| --- | --- |
| Stephens | 319,144 |
| Bahr | 1,134,092 |
| Gray | 1,703,232 |
| Nathan | 2,016,905 |
| Crake | 2,337,711 |
| Ferguson | 2,646,822 |
| Cavallier | 2,656,857 |
| Holcombe | 2,690,934 |
| Johnson | 3,462,175 |

-continued

| Inventor | U.S. Pat. No. |
| --- | --- |
| Beene | 3,675,950 |
| Sable | 3,942,824 |
| Carlson | 4,205,926 |
| Kupcak | 4,226,550 |
| Garrett | 4,436,118 |
| Gallagher | 4,484,833 |
| Takahashi | 4,577,664 |

Applicant believes the information found in these patents is not as pertinent as the information specifically discussed above. However, applicant believes that the Examiner would be interested in anything found by a experienced patent searcher.

SUMMARY OF THE INVENTION (1) Progressive Contribution to the Art

No attempt has been made, to my knowledge, to qualify other resinous, fusion bond applied powder coatings for the protection of sucker rod couplings. The unique combination of physical and chemical properties, required of the sucker rod coupling coating resin system, preclude the use of nearly all coating resin types. For utility on sucker rod couplings, a coating must be resistant to down-hole attack by corrosive chemicals, at elevated temperatures and pressures. This severely limits the types of coating resins which may be used. The coating must also have a high resistance to mechanical damage. Resins with this physical attribute are common, but they do not have the required chemical resistance for down-hole oil field service. The coating resin must also bond to the coupling substrate, to preclude the spread of corrosive fluids between the protective coating and the coupling body. This further restricts the availability of resin types. In addition to these properties, the resin must also be highly resistant to abrasion. At the same time, it must be soft and be capable of deforming (extruding) without losing a bond, when the coating is subjected to rod tongs and wrenches. Previously, all of these necessary attributes have ruled out the use of fusion bond applied powder coatings on sucker rod couplings.

If a coating resin class having all these properties could be found, then an inexpensive method of sucker rod coupling protection would be available. In addition to the abrasion resistance and corrosion protection for the body of the sucker rod coupling, the resin could also be deposited on the radial faces of the sucker rod couplings, to permit a better seal between the coupling and the rod. This, besides overcoming problems associated with imprecise machining of the couplings and rod faces, would lock the coupling in place on the sucker rod. The coupling could not unscrew, down-hole in-service. At the same time, the presence of the coating on all or part of the radial faces of the couplings would preclude the passage of corrosive chemicals into the hollow coupling core.

Any diameter of sucker rod coupling can be prepared for abrasion and corrosion resistance, using the new method and apparatus. Machining costs are minimized. Expensive molds are not needed. A protective coating is thermally bonded to the sucker rod coupling so it cannot slip out of position in-service. Corrosive fluids cannot get between the coupling and the protective coating. The external protective coating extends along the longitudinal axis, across the bevels on each end, and just beyond the outside edges of the radial faces. Coating on the radial faces will extrude when the coupling is installed, thereby locking the coupling in place. Extending across the entire length of the coupling, the specially selected protective coatings provide more abrasion resistance than would be evidenced with the mild steel coupling, along. Corrosion resistance would also be provided.

A coupling is first machined to decrease its diameter. Then, a chamfer or bevel is machined onto both ends of the coupling. After machining, the coupling must be cleaned, thermally or chemically, to remove all traces of oils which are present from the manufacturing operations. Then, the external diameter of the coupling and ends are abrasive blast-cleaned to achieve a suitable, uniform, angular, anchor profile. Before oxidation can occur, and while the coupling surface is free of contaminants, the coupling is placed into an oven and heated to a temperature which will exceed the melting point of the resinous, fusion bond coating which will be applied. Once at this temperature, the coupling is removed from the oven and protective masks are inserted into both ends. Before the coupling has time to cool below the melting point of the resinous powder coating, it is coated with a resinous substance which will bond to the coupling, provide abrasion resistance, and resist attack by down-hole oil field chemicals.

Few coating resin types are useful in this method. All must be corrosion resistant in the expected down-hole environment in an oil well. They must also be abrasion and chip resistant, being able to withstand handling abuse and pounding against the tubing wall in-service. The protective coating may be applied by the fluidized bed process, hot flocking, or electrostatic spray. Once coated to the required film thickness, the coated coupling is placed back into an oven, where the resinous coating is allowed to flow to form a uniform film. In cases where a thermoplastic resinous, fusion bond coating is used, a short post-heating time may be required. When thermoset resinous coatings are being used, a longer post-heat time is required to achieve full cure (cross-linking reaction). Regardless of the coating resin type selected, the coating should be present on the radial faces, or extend slightly above the plane of the radial faces, on the ends of the couplings, in order to allow the formation of a locking seal when the coupling is installed on a sucker rod.

(2) Objects of this Invention

An object of this invention is to provide a sucker rod string in oil wells.

Further objects are to provide such a string with couplings which are resistant to corrosion and abrasion.

Further objects are to achieve the above with devices that are sturdy, compact, durable, lightweight, simple, safe, efficient, versatile, ecologically compatible, energy conserving, and reliable, yet inexpensive and easy to manufacture and maintain.

Other objects are to achieve the above with a method that is rapid, versatile, ecologically compatible, energy conserving, efficient, and inexpensive, and does not require highly skilled people to connect, adjust, operate, and maintain.

Still further objects are to achieve the above with a product that is easy to store, has a long storage life, is safe, versatile, efficient, stable and reliable, yet is inexpensive and easy to manufacture.

The specific nature of the invention, as well as other objects, uses, and advantages thereof, will clearly appear from the following description and from the accompanying drawing, the different views of which are not scale drawings.

Figure 1:
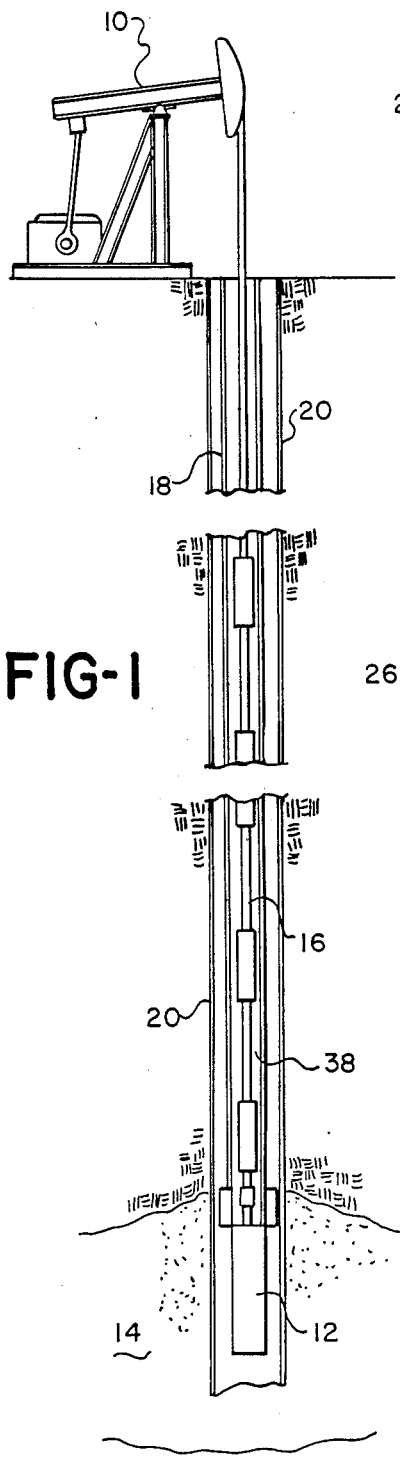
FIG. 1 is a schematic representation of an oil well pumping unit.

As an aid to correlating the terms of the claims to the exemplary drawing, the following catalog of elements and steps is provided:

10 pump jack
12 pump
14 reservoir
16 sucker rod string
18 tubing string
20 casing
22 sucker rods
24 pin
26 coupling or cuff
28 wrench flats
30 shoulder
32 radial face
34 bore
36 threads
38 annulus
40 bevel
42 cylindrical portion
44 distal plug
46 eyelet plug
48 eyelet
50 bed or resinous material
52 container
54 porous plate
56 plenum
58 air supply connection
60 table
62 table mask
64 nozzle
66 coating
70 load
72 holding assembly
74 drive rod
76 tubing samples

DESCRIPTION OF THE PREFERRED EMBODIMENTS

Referring to the drawings, there may be seen a typical well installation in FIG. 1. Specifically, pump jack 10 is connected to down-hole pump 12 which is located within a petroleum reservoir 14. Sucker rod string 16 extends from the pump jack to the pump. Those skilled in the art will understand that tubing string 18 extends from the surface of the ground and is fluidly connected to the pump 12. Casing 20 is outside the tubing string 13 and extends into the reservoir 14 below the pump 12. The sucker rod string 16 includes sucker rods 22. Each end of the sucker rods will have a pin 24 which is threaded into one end of coupling 26. The sucker rods will have wrench flats 28 adjacent to the pins 24. Between to the pins and the wrench flats, the sucker rod will have shoulder 30 which forms a friction fit against radial face 32 of the coupling 26. The couplings, have an inside bore 34 which have threads 36 substantially the entire length. The oil will flow within annulus 38 between the sucker rod string 16 and the tubing string 18. It is known in the art that it is desirable to have as large an annulus 38 as possible and to have obstruction within the annulus at a minimum to permit unimpeded flow of the oil upward through the tubing. Therefore, it is desirable that no portion of coupling 26 be larger than necessary. Also, it will be understood that the outside diameter of the coupling 26 will normally be the largest diameter of any of the elements of the sucker rod string 16.

Those having ordinary skill in the art will understand that the description to this point is old and well known before my invention.

In order for a coupling according to this invention to be manufactured, a sucker rod coupling for 0.750 inch diameter sucker rods is machined to decrease its diameter by 0.080 inches. Then, a gradual chamfer or bevel 40 is machined onto both ends, such that the diameter at the radial face 32 will be less than that of the sucker rod pin end face or shoulder 30. The coupling 26 is then placed into an oven where it is heated above the incineration point of the oils which might be present from the manufacturing operations, 750° F., in this case. It is maintained at this temperature for sufficient time to burn away all organic substances (2 hours, in this example). Care is taken to insure that the coupling is not heated to a temperature, sufficiently high, to adversely effect the metallurgy of the mild steel. Once thermally cleaned, the coupling is allowed to cool, gradually, to ambient temperatures.

Figure 5:
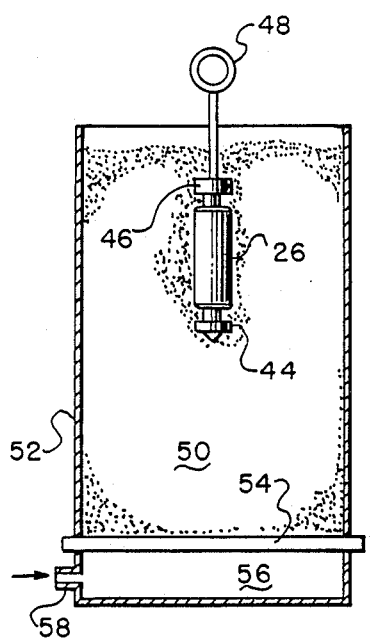
FIG. 5 is a schematic representation of the sucker rod coupling submerged in a fluidized bed of resinous coating material.

Next, the external diameter of the cylindrical portion 42 and the ends of the coupling are abrasive blast-cleaned, to establish a uniform, angular, anchor profile of approximately 0.002 inches, depth. Before any visible oxidation can occur, the coupling 26 is placed into an oven where it is heated to 650° F. Once at this temperature, the coupling is removed from the oven and protective masks or plugs are inserted into both ends. Referring to FIG. 5, distal mask plug 44 is placed into one end of the coupling 26 which is in the form of a cuff. The distal mask or plug 44 fits snugly in the threads at this end and covers all internal surfaces of the bore 34 of the coupling or cuff 26. Eyelet mask or plug 46 is inserted into the other end of the cuff 26 and covers up the threads 36 and inside bore 34 of that end. The eyelet plug has eyelet 48 thereon so that a hook or other means may be attached thereto for handling the hot cuff with the plugs therein. The masks will preclude any coating getting into the internal threaded section of the coupling.

Once masked, and while the metal temperature of the coupling still exceeds the melting point of the intended, fusion bond coating, it is immersed into a fluidized bed containing the resinous fusion bond, powder coating (See FIG. 5). As seen, the bed of resinous material 50 is included within a container 52. The bottom of the container has porous plate 54 separating the bed 50 from plenum 56 below it. Air blown into the plenum 56 through air connection 58 will fludizie the bed of finely granulated or powdered material as is well known. A uniform fluidization has been achieved. For this example, a high molecular weight polyamide coating (Nylon-11) is being fluidized. When the hot coupling makes contact with the Nylon powder coating particles in the fluidized bed, the nylon melts onto the surface of the coupling. To insure that a uniform film or coating 66 is established, the coup;ing is kept in motion, while immersed in the fluidized bed of nylon coating particles. The air supply into the fluidized bed plenum 56 is regulated to achieve a sufficient volume of air, passing through the porous plate 54 at the bottom of the fluidized bed. The upward movement of the airstream keeps the nylon powder particles suspended, and in constant motion. After sufficient immersion time has elapsed (60 seconds in this example) to build the required film or coating thickness (e.g., 0.040 inches), the coupling is removed from the fluidized bed. The protective masks are quickly removed from both ends of the coupling. If the coating film is smooth and has a uniform gloss, it is quenched by immediately dropping into a vessel containing water, which is at, or near, ambient temperature. Cooling in this manner, the Nylon coating 66 will have much greater resistance to chipping and mechanical damage, during handling, and while in-service. If more flow is required, or if the coating surface does not have a uniform gloss, it is placed back into the 650° F. oven, and allowed to reamin there until sufficient flow-out is achieved. In this case, the coupling must also be water quenched upon exit from the oven. If sufficient Nylon coating film thickness has not been deposited, the coupling may be reheated to 650° F., and another layer of Nylon coating applied. The second layer will combine with the first.

Figure 2:
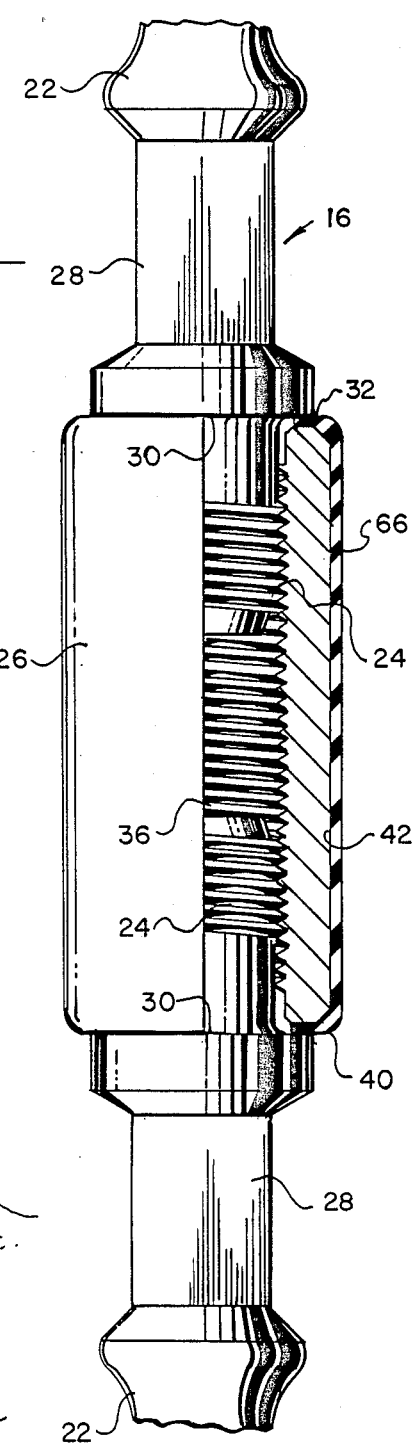
FIG. 2 is a view of the sucker rod with the sucker rod coupling in half section.
Figure 2A:
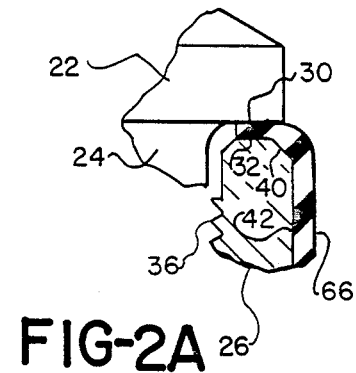
FIG. 2A is a partial detail of the shoulder of the sucker rod and the radial face of the coupling with the coupling in section.
Figure 3:
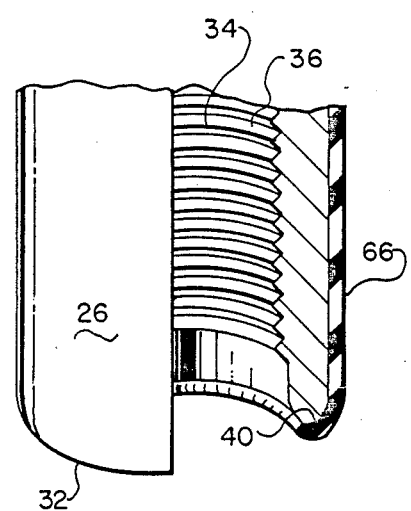
FIG. 3 is an enlarged portion of a sucker rod coupling in half section showing my new invention.

Once the coating operation has been completed, the Nylon coating 66 (see FIGS. 2, 2a, and 3) will extend somewhat across the radial faces of the coupling, or above the plane of the radial faces, to permit a locking seal. It will also extend across the entire length of the coupling body. The exact location of the coating deposition is controlled through the use of coating masks, during the coating operations. The coating film thickness is controlled by the coupling temperature, and the immersion time in the fluidized bed. (Higher temperatures and longer immersion times produce greater coating film thicknesses.) Excess Nylon coating may be machined away from the coupling body or radical faces.

Obviously the cylindrical portion 42 of the coupling is an exposed surface; however, the radial face 32 is covered when the coupling 26 is made up against the shoulder 30 of the sucker rod.

Using the same fluidized bed technique, a 0.625 inch diameter sucker rod coupling can be protected with a Teflon powder coating. The coating procedure varies slightly, however. As with Nylon, the coupling is first machined to decreaae its diameter. Then it is thermally cleaned to incinerate organic substances which may contaminate the surface to be coated. Next, it is abrasive blast-cleaned, using a flint abrasive, at approximately 90 psi, air pressure. Before any oxidation can occur, the coupling is primed with a special primer which will allow the Teflon resin to bond to the coupling. The primer is allowed to dry, while standing in ambient temperature air. The primer seals the freshly cleaned surface, precluding oxidation. Next, the primed coupling is placed into a preheat oven, where it is brought up to the proper coating application temperature (725° F.). Once at this temperature, the coupling is removed from the oven and protective masks or plugs are quickly inserted into both ends of the coupling. The coupling is then immersed into a fluidized bed containing Teflon powder particles. The coupling is moved up and down and/or back and forth under the fluidized bed surface for 60 seconds. Then, it is removed and placed back into an oven, where it is heated at 725° F. for an additional 20 minutes. During this time, the Teflon particles will flow out to form a uniform coating film. After this post-heating cycle, and if sufficient film thickness has been deposited, the masks are removed and the coated coupling is allowed to cool, gradually, to ambient temperatures. Any excess Teflon may be machined away. If insufficient film thickness has been deposited, the coated coupling may be reheated to 725° F. and another layer of Teflon applied. The second layer will bond to the first layer. An additional post-heat for several minutes at 725° F. will be required to allow the second coat to flow out properly.

Figure 4:
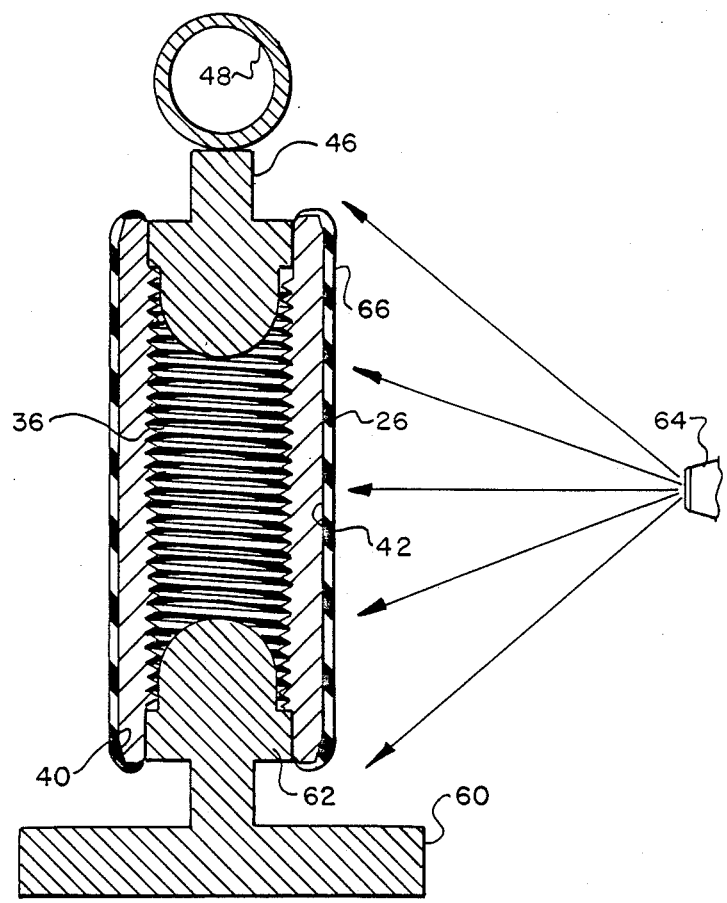
FIG. 4 is a sectional view of a sucker rod coupling with the mask or plug attached thereto being spray coated.

In yet another example of this method, a 0.875 inch diameter mild steel sucker rod coupling can be protected with a polyphenylene sulfide (Ryton) powder coating. Before the coating is applied, the coupling is machined to decrease its diameter and to establish a gradual chamfer or bevel 40 on both ends. Then, the coupling is chemically cleaned to remove all traces of oils which may be present from the manufacturing operations. Next, the coupling is grit-blasted to establish a uniform anchor profile. The coupling is then heated to the proper coating application temperatures (750° F.), before oxidation can occur. Once at this temperature, the coupling is removed from the oven and placed onto rotating coating table 60. (See FIG. 4) The protective mask or eyelet plug 46 is placed into the top of the coupling 26. The rotating table platform has table mask or plug 62 for the bottom of the coupling while standing vertically. The plug 62 functions as the distal plug 44. While being rotated about its longitudinal axis, a powdered polyphenylene sulfide coating resin is blown from nozzle 64 into the surface of the coupling. As the powder particles make contact with the hot coupling, they melt to form a uniform coating film. Once coated, the coupling 26 is removed from the table plug 62 and the eyelet mask 46 is removed and the coated coupling is placed back into the oven for curing. The coated coupling is further heated for 115 minutes at 750° F. to insure that a complete chemical reaction has occurred. After this cure cycle, the couplings are quenched in a vessel containing water, which is at, or near, ambient temperature. The rapid cooling of the coated coupling will increase the toughness of the Ryton coating. If excess coating is present, after cooling, it may be machined away.

In addition to the fusion bond appliec coating resins already mentioned, others can be used under the scope of this disclosure. To qualify for use, however, the coating resin must lend itself to fusion bond application. The coating must be highly chip resistant, abrasion resistant, and must be capable of withstanding attack by harsh, down-hole oil field chemicals.

Besides using a conventional, mild steel coupling as the core for this method and apparatus, higher tensile strength steels may be used. Because a small amount of each coupling is machined away before coating, the structural strength of the coupling is diminished, slightly. This can be overcome, using steels of high tensile strength. Such steels are not preferred for bare sucker rod couplings, since they are more prone to chemical attack, down-hole. Since the protective coatings described in this disclosure act as a corrosion resistant barrier, this tensile strength/corrosion susceptibility relationship is of no concern. These higher tensile strength steels would be protected from corrosion by the coating described in this disclosure.

While examples are given showing fluidized bed and hot flocking coating tehniques, it is understood that any coating process may be used under the scope of this method to include electrostatic cold or hot spray, immersion in a fluidized or non-fluidized bed of resinous powder, hot flocking, or any combination of these techniques. Also, immersion coating may be used with Ryton. Further, the spray coating described above may be used with Nylon or Teflon.

(1) Useful Coating Resin Types

While more coating types may qualify for use, under the scope of this disclosure, the following products have proven to have the necessary physical and chemical properties for use as a sucker rod coupling coating:

For Nylon: Corvel® Black 70-7008, Product of Morton Thiokol, Incorporated, Reading, Pa.

For Ryton: Nacote PRO-1 Clear, Product of Nacote, Incorporated, Bartlesville, Okla. Sometimes called RYTON.

For Teflon: 532-5010 Clear Over 850-201 Primer, Product of E.I. duPont, de Nemours, Incorporated, Wilmington, Del. Sometimes called TEFLON.

The following physical properties were provided by the manufacturer of these products:

| Property | Test Method (ASTM) | Units | NYLON | RYTON | TEFLON |
|---|---|---|---|---|---|
| Shore Hardness | D2240 | D | 75 | 87 | 55 |
| Tensile Strength | D412 | psi. | 8500 | 12000 | 4000 |
| Dielectric Strength | D149 | Volts/Mil | 1000 | 400 | 2000 |
| Elongation | D638 | % | 30 | 0.7 | 300 |
| Water Absorption | D150 | % | 1.6 | 0.07 | 0.03 |
| Specific Gravity | D792 | Unity | 1.08 | 2.00 | 2.15 |
| Taber Abrasion | D1044 CS-10 Wheel 1000 GM. Load 1000 Cycles | Grams | 0.014 | 0.070 | Unknown |
| Glass Transition | D.S.C. | °F. | 109 | 545 | 575 |
| Impact Resistance | Gardner | In.-Lbs. | ≧160 | ≧160 | ≧160 |

(2) Abrasion Resistance Data

Figure 6:
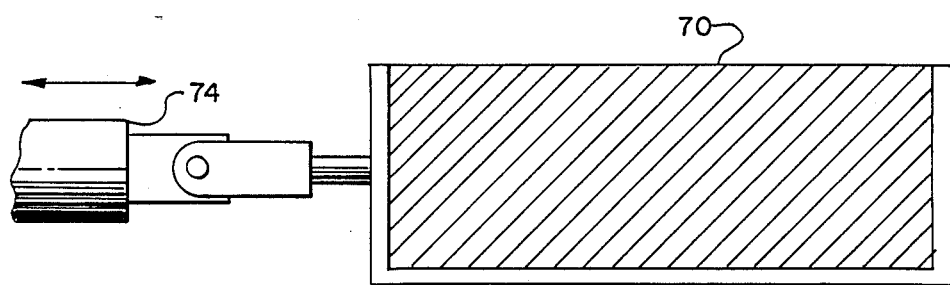
FIG. 6 is a schematic representation of an abrasion test apparatus.
Figure 6:
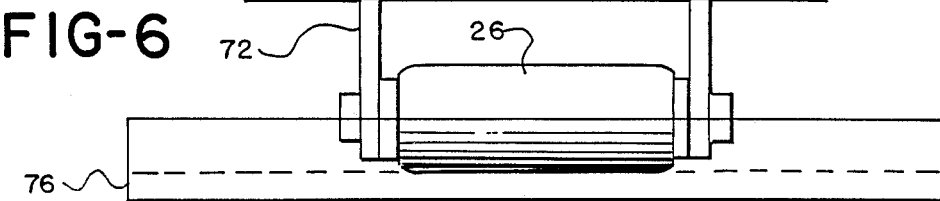

To compare the relative abrasion resistance of sucker rod couplings, an abrasion tester was constructed. (See FIG. 6) For the test, the coupling 26 is positioned under load 70 of 100 pounds. Holding assembly 72 is connected to reciprocating rod which is driven back and forth across a distance of two inches through the use of a motor and gear box (not shown). The reciprocating frequency is constant, and at a rate of one stroke per second. Below each coupling 26 tubing samples 76 are held in a fixed, horizontal position. When the coupling holding assembly 72 is put into the test position, the couplings 26 are aligned, axially, with the tubing samples 76. Since the connection between the holding assembly and the drive rod is flexible, both couplings receive an equal loading, and their entire axial length rests on the internal diameter of the tubing.

Each test was run for 24 hours, or 86,400 strokes. For each test, 2.375 inch diameter tubing and 0.750 inch diameter couplings were used. The tubing was abrasive blast-cleaned to a "white" metal finish, with a uniform, angular, anchor profile of approximately 0.0015 inches, depth. No lubricant was used to minimize the abrasion. Coupling diameters and tubing wall thicknesses were measured with a micrometer, before and after each test. The following results were evidenced:

| Coupling Description | Average Abrasion Loss (1/1000 inches) | |
|---|---|---|
| | Coupling | Pipe Wall |
| Mild Steel | 104.0 | 60.0 |
| Spraymetal Jacketed | 0.3 | 5.0 |
| Nylon Coated | 7.7 | 0.0 |
| Ryton Coated | 15.0 | 0.0 |
| Teflon coated | 3.0 | 0.3* |
| U.S. Pat. No. 4,602,807 | 8.0 | 1.8 |

*The Teflon coating was 0.002 inches thick on one end. After the Teflon coating abraded away, the bare metal of the coupling abraded the internal diameter of the tubing.

The embodiments shown and described above are only exemplary. I do not claim to have invented all the parts, elements or steps described. Various modifications can be made in the construction, material, arrangement, and operation, and still be within the scope of my invention.

The restrictive description and drawing of the specific examples above do not point out what an infringement of this patent woud be, but are to enable one skilled in the art to make and use the invention. The limits of the invention and the bounds of the patent protection are measured by and defined in the following claims.

I claim as my invention:

1. The method of protecting tubular sucker rod couplings having threads, a diameter and two ends having radial faces from corrosion and abrasion, comprising:
   a. reducing the diameter of the couplings by removing metal,
   b. choosing a granulated resinous material having a specific fusion temperature,
   c. heating said coupling to a temperature above said fusion temperature,
   d. inserting plugs into each end of the coupling,
   e. contacting all exposed surfaces of said coupling with said granulated resinous material until a desired amount of resinous material fuses onto the exposed surface of the coupling, said desired amount to be a thickness equal to the metal removed as described in step (a) above,
   f. removing said plugs from said coupling,
   g. cooling said coupling.

2. The method of protecting tubular sucker rod couplings having threads, a diameter and two ends having radial faces from corrosion and abrasion, comprising:
   a. reducing the diameter of the couplings by removing metal,
   b. choosing a granulated resinous material having a specific fusion temperature,
   c. heating said coupling to a temperature above said fusion temperature,
   d. inserting plugs into each end of the coupling,
   e. contacting all exposed surfaces of said coupling with said granulated resinous material until a desired amount of resinous material fuses onto the exposed surface of the coupling, said desired amount to be a thickness equal to the metal removed as described in step (a) above,
   f. removing said plugs from said coupling,
   g. cooling said coupling.

3. The invention as defined in claim 1 wherein said contacting step includes:
   j. fluidizing a bed of said granular resinous material, and
   k. submerging said heated coupling in the fluidized bed.

4. The invention as defined in claim 2 wherein said contacting step includes:
   j. placing the coupling upon a turn table, thereby
   k. rotating said coupling, and
   l. spraying said resinous material against said heated coupling.

5. The invention as defined in claim 2 wherein said granular resinous material is chosen from the group consisting of:
   j. Nylon, Teflon, and Ryton.

6. The invention as defined in claim 2 further comprising wherein after said contacting step is preformed and after removing said plugs from the coupling:
   j. heating the coupling in an oven at an elevated temperature, thereby
   k. curing the resinous material.

7. The invention as defined in claim 2 wherein said granulated resinous material is selected from the group consisting of:
   j. Teflon and Ryton.

8. The invention as defined in claim 6 futher comprising wherein after said contacting step is preformed and after removing said plugs from the coupling:
   j. heating the coupling in a oven at an elevated temperature, thereby
   k. curing the resinous material.

9. The invention as defined in claim 8 further comprising:
   l. submerging the coupling in water at about ambient temperature immediately after the resinous material is cured, thus quenching the material.

10. The invention as defined in claim 9 wherein said contacting step includes:
    m. fluidizing a bed of said granular resinous material, and
    n. submerging said heated coupling in the fluidized bed.

11. The invention as defined in claim 9 wherein said contacting step includes:
    m. placing the coupling upon a turn table, thereby
    n. rotating said coupling, and
    o. spraying said resinous material against said heated coupling.

* * * * *